United States Patent [19]

Pape

[11] Patent Number: 5,716,471
[45] Date of Patent: Feb. 10, 1998

[54] METHOD FOR SECURING ARTICLES TO LAMINATES

[75] Inventor: Leslie Pape, Novi, Mich.

[73] Assignee: Elopak Systems AG, Glattbrugg, Switzerland

[21] Appl. No.: 549,972

[22] Filed: Oct. 30, 1995

[51] Int. Cl.[6] .................. B65B 7/00; B65B 61/18
[52] U.S. Cl. .................. 156/69; 53/133.2; 53/410; 156/309.9; 156/321; 156/322; 493/87
[58] Field of Search .................. 156/69, 309.9, 156/321, 322; 493/87; 229/125.04, 125.33; 53/133.2, 133.3, 410

[56] References Cited

U.S. PATENT DOCUMENTS

| | | | |
|---|---|---|---|
| 3,325,332 | 6/1967 | Cleereman | 156/309.9 |
| 3,498,868 | 3/1970 | Saumsiegle | 156/321 |
| 3,532,571 | 10/1970 | Ausnit | 156/309.9 |
| 3,813,315 | 5/1974 | Valyi | 156/309.9 |
| 4,507,168 | 3/1985 | Konaka | 156/322 |
| 4,669,640 | 6/1987 | Ando et al. . | |
| 4,813,578 | 3/1989 | Gordon et al. . | |
| 4,872,935 | 10/1989 | Newkirk | 156/309.9 |
| 4,925,034 | 5/1990 | Robichaud et al. . | |
| 4,948,015 | 8/1990 | Kawajiri et al. . | |
| 4,964,562 | 10/1990 | Gordon . | |
| 5,088,643 | 2/1992 | Frazier et al. | 229/125.15 |
| 5,101,999 | 4/1992 | Robichaud et al. . | |
| 5,152,438 | 10/1992 | Gordon et al. | 222/546 |
| 5,624,528 | 4/1997 | Abrams | 156/69 |

Primary Examiner—Daniel Stemmer
Attorney, Agent, or Firm—Reising, Ethington, Barnard & Perry, PLLC

[57] ABSTRACT

A method for securing a pour spout fitment to a thermoplastic-coated container, wherein at least a surface of a pour spout fitment is heated remotely by a suitable heating mechanism, to a predetermined temperature. When the heated fitment surface is applied to a selected surface of an erected, thermoplastic-coated container, the heat energy is transferred to the latter surface to an extent capable of activating the thermoplastic coating thereon. Upon cooling, the fitment and the container surface are bonded together, without the need for a back-up or support mechanism, such as a mandrel or anvil.

11 Claims, 1 Drawing Sheet

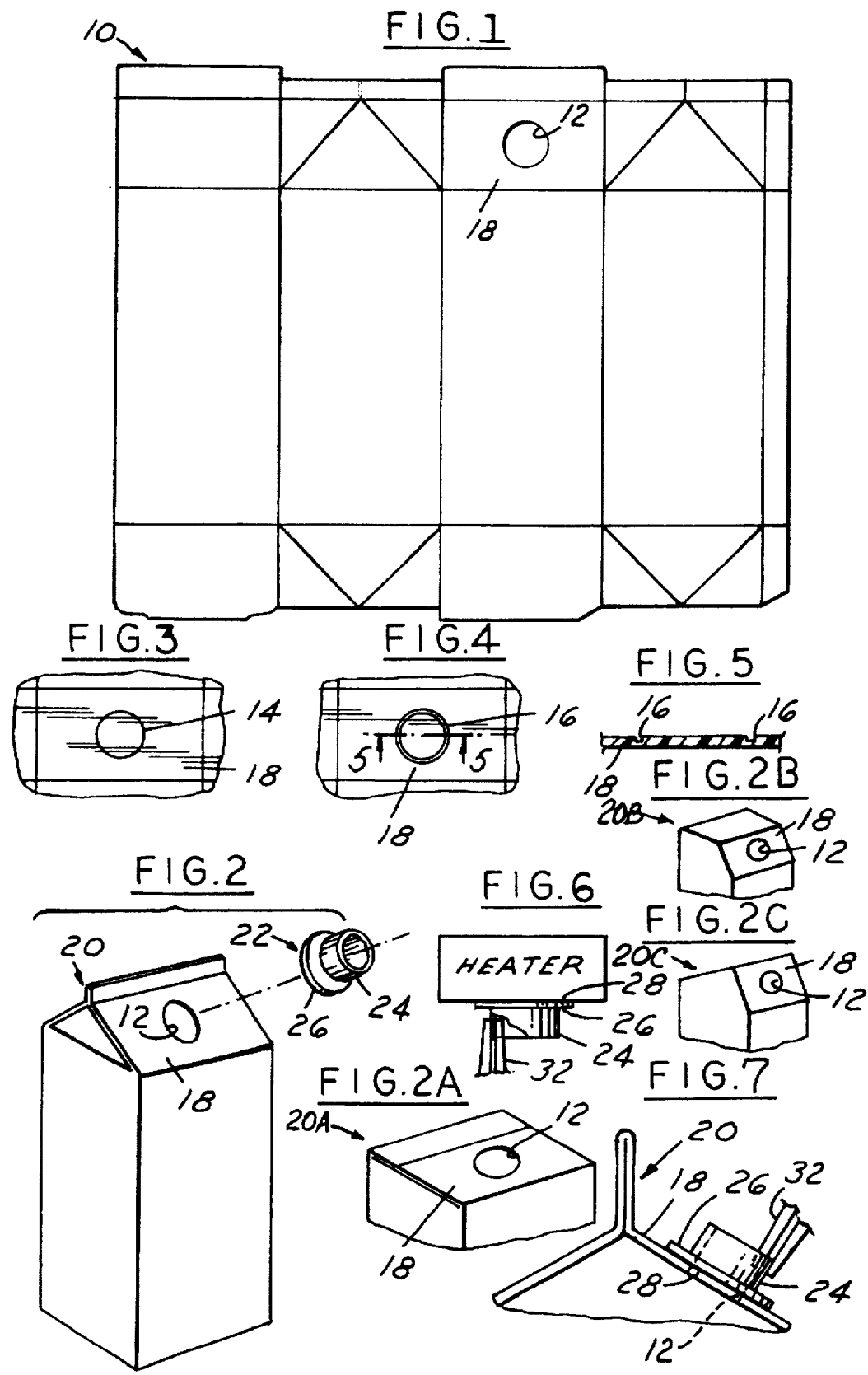

METHOD FOR SECURING ARTICLES TO LAMINATES

TECHNICAL FIELD

This invention relates primarily to a method for securing articles to laminates and, more particularly, to such a method wherein a flange of a pour spout is heated, and applied/bonded to a thermoplastic-coated container, without a support mechanism, such as a mandrel or anvil.

BACKGROUND ART

Heretofore, pour spout fitments have been secured to thermoplastic-coated container panels by the following known methods.

In Gordon et al U.S. Pat. No. 4,813,578, the following method is employed: A mandrel is inserted into the interior of the still-open mouth of the container, with the mandrel abutting the interior surface of a barrier layer and forming a back-up support. Hot air or radiant heat is applied to the external surface of a gable top wall immediately around an opening to thereby soften the polyethylene coating, with a pour spout fitment flange placed on the softened layer to thereby adhere the flange to the wall. An external mandrel is also employed to press the assembly against the internally positioned mandrel. This pressure is maintained until the coating cools and thereby effects permanent adhesion of the flange to the wall. Gordon et al disclose that other methods, such as ultrasonic adhesion and impulse heating, may be employed.

Luch et al U.S. Pat. No. 5,249,695 merely recites that attachment to the polymer-coated paperboard panel is accomplished by welding or otherwise adhering a spout fitment flange to the polymer coating.

Gordon U.S. Pat. Nos. 4,964,562 and 5,152,438 each utilize an ultrasonic sealing horn and a back-up support mandrel operative around respective pouring apertures.

Kawajiri et al U.S. Pat. No. 4,948,015 discloses the use of an ultrasonic horn to bond a flange of a pour spout fitment to an inner or back surface of a container panel around a pouring aperture.

Ando et al U.S. Pat. No. 4,669,640 suggests fusing a pour spout flange to an inside surface of a carton gable top "either thermally or ultrasonically."

Frazier et al U.S. Pat. No. 5,088,643 states that "the pour spout fitment is preferably adhered to the outer surface of the container panel by impulse heating under pressure such as ultrasonic sealing although other methods may be used as desired."

Robichaud et al U.S. Pat. No. 4,925,034 discloses adhesively bonding a pour spout fitment by a hot melt glue to a top outer surface of a container.

Robichaud et al U.S. Pat. No. 5,101,999 suggests that a spout or closure be "attached to the package top by any suitable means such as an adhesive applied to a bottom surface of the closure to be attached to the package top." Where the package is coated with an outer thermoplastic layer of polyethylene, which discourages such adhesion, Robishaud et al disclose perimeter cuts which may be serrated or applied as perforated cuts. Such serrations or perforated cuts need only penetrate the polyethylene outer layer to allow the adhesive to bond with the underlying carrier or paper layer.

DISCLOSURE OF THE INVENTION

A general object of the invention is to provide an improved method for securing an article to a thermoplastic coating of a laminate, in particular securing a pour spout fitment to a thermoplastic-coated container.

Another object of the invention is to provide a method for securing a pour spout fitment to a thermoplastic-coated container, wherein the pour spout fitment is heated remotely by a suitable heating mechanism, to a predetermined temperature, such that, when the fitment is applied to a selected surface of a thermoplastic-coated container, the heat is transferred to the latter surface at a temperature capable of activating the thermoplastic coating; upon cooling, the fitment and the container surface bond together.

A further object of the invention is to provide a method of securing a pour spout fitment to an externally thermoplastics-coated container, which method is applicable downstream of any forming, filling and sealing system for the container.

These and other objects and advantages will become more apparent when reference is made to the following drawings and accompanying description.

BRIEF DESCRIPTION OF THE DRAWINGS

FIG. 1 is a plan view of a thermoplastic-coated paperboard blank having been formed, scored and cut from a laminate web which has at both sides thereof coatings of a suitable polymer material, such as polyethylene;

FIG. 2 is a perspective view of a gable-top container formed from the blank of FIG. 1, and a perspective view of a pour spout fitment to be mounted on the container of FIG. 2;

FIG. 2A is a fragmentary perspective view of a flat-top container formed from a suitable blank;

FIG. 2B is a fragmentary perspective view of a one-sided slant-top container formed from a suitable blank;

FIG. 2C is a fragmentary perspective view of a slant-top container formed without a gable;

FIGS. 3 and 4 are fragmentary plan views of alternate arrangements of a part of the FIG. 2 container;

FIG. 5 is an enlarged cross-sectional view taken along the plane of the line 5—5 of FIG. 4, and looking in the direction of the arrows;

FIG. 6 is a fragmentary schematic view of the pour spout fitment of FIG. 2 being heated by an external heater; and FIG. 7 is a fragmentary view of the fitment being applied to the container of FIG. 2.

BEST MODE OF CARRYING OUT THE INVENTION

Referring now to the drawings in greater detail, FIG. 1 shows a thermoplastic-coated, such as polyethylene-coated, blank 10 having a pour spout opening 12 (FIGS. 1 and 2) or a weakened circular score line 14 (FIG. 3) or partially cut circular line 16 (FIGS. 4 and 5) formed in a panel 18 thereof. The blank 10 is formed into one of a, so-called, gable-top container 20 (FIG. 2), a flat-top container 20A (FIG. 2A), a one-sided slant-top container 20B (FIG. 2B), or a slant-top container 20C (FIG. 2C), in well known manners on typical forming, filling and sealing machines (not shown).

A pour spout fitment 22 includes a body 24 and an external mounting flange 26. It may incorporate any preferred design insofar as the internal openable configuration is concerned.

After having been formed, filled, and sealed, the container 20, 20A, 20B, or 20C, is ready to receive the pour spout fitment 22. The fitment 22 may be formed of any suitable material, such as high density polyethylene (HDPE). The bottom surface 28 (FIG. 6) of the flange 26 is subjected to heat at a predetermined temperature without melting or combusting, from a suitable heater, represented as 30, wherein the predetermined temperature is below the melting point of the material of the fitment. Upon reaching the designated temperature, the pour spout fitment 22 is placed by any suitable placement means, represented as 32 (FIGS. 6 and 7), onto the panel 18 around the opening 12 or the weakened score line 14 or the partially cut line 16.

It should be noted that the thermal energy required to be supplied to the flange 26 by the heater 30 depends upon various parameters, such as:

a. the melting point of the material,
b. the storage temperature of the spouts,
c. the ambient temperature on the machine, and
d. the humidity.

By the time of contact with the polyethylene-coated panel 18, the heated fitment 22 surface 28 has absorbed and retained sufficient heat to activate the poly-ethylene on the contacted surface of the panel. Upon cooling, the flange 26 and the panel 18 become bonded together.

It appears from experiments that, if the flange 26 and the outermost coating of the container are of the same thermo-plastics material, the flange should be of significantly greater thickness than the coating in order to be able to store enough thermal energy to melt the coating surface when applied thereto. It also appears that the material(s) arrangements of the fitment and of the laminate should be such that heat can be readily dissipated from the flange but not from the coating, since otherwise the temperature of the flange might rise to a level such that the flange distorts easily and/or the temperature of the coating might never rise to a level such that the coating becomes tacky or molten for bonding purposes.

It is not essential that the thermoplastic coating to be melted should be on the container; instead, the flange 26 could be the laminate with the external thermoplastic coating, and the container the heat-giving article. The container could then be a plastics bottle or a laminate carton with a thick external thermoplastic layer portion.

EXAMPLE

In an example of successful bonding of a pour spout fitment to a laminate container, a pour spout fitment of LDPE (low density polyethylene) with a flange thickness of 1 mm. was heated to a temperature of 230° F. to 250° F. and applied to the outermost layer of a gable-topped carton consisting of a laminate 0.71 mm. thick and containing the following layers progressing inwardly of the carton:

(i) an outermost layer of LDPE of 14 grams/ream
(ii) a paperboard layer of 272 grams/ream
(iii) an LDPE layer of 18 grams/ream
(iv) an Al (aluminum) foil layer of 24 grams/ream
(v) a "SURLYN" layer of 6 grams/ream
(iv) an innermost layer of LDPE of 50 grams/ream.

It may be desirable to pre-heat the surface of the container to be contacted by the heated fitment 22, in order to ensure that such surface is clean and dry.

Industrial Applicability

It should be apparent that the invention provides a novel method of applying a pour spout fitment to a thermoplastic-coated container.

It should also be apparent that, by heating a pour spout fitment to a predetermined temperature remote from a thermoplastic-coated container, there is no need for employing the heretofore well known methods of (1) applying heat to a container surface in conjunction with pressure against a flange of the pour spout fitment, wherein the container surface is backed up by a support mechanism, such as a mandrel or an anvil; or (2) applying ultrasonic vibration and pressure to a fitment flange and container panel combination; or (3) applying a hot melt or an adhesive to the bottom surface of a fitment and mounting same on a container panel.

It should be still further apparent that the erected or formed container provides a box type support, capable of being subjected to the application pressure involved, without the need for a mandrel or anvil back-up, as heretofore used to withstand the sealing pressures required.

While but one general embodiment of the invention has been shown and described, other modifications thereof are possible within the scope of the following claims.

What is claimed is:

1. A method for applying an article to a thermoplastic coating of rigid laminate, the method comprising the steps of:

a. providing an article;
b. heating a portion of the article to a predetermined temperature by a suitable heater, wherein said predetermined temperature is below the melting point of the material of the portion of the article;
c. placing said portion of the heated article on a portion of the thermoplastic coating without a back-up support around said latter portion, to activate said portion of the thermoplastic coating; and
d. one of allowing and causing the respective portions of the heated article and the coating to cool, to thereby become bonded together.

2. A method according to claim 1, wherein said article is a pour spout fitment.

3. A method according to claim 1, wherein said portion of the article is of a thickness greater than that of said portion of the coating.

4. A method according to claim 1, wherein said rigid laminate has formed therein one of an opening, a score line, and a partial depth cut, and wherein the article has an annular flange on an end thereof and constituting said portion of said article, said method including placing the heated flange around said one of an opening, a score line, and a partial depth cut.

5. A method according to claim 1, wherein said portion of said coating is pre-heated to a predetermined temperature to assure that said portion of said coating is clean and dry.

6. A method according to claim 1, wherein said rigid laminate is in the form of an erected container providing a box support, without the need for a mandrel or anvil back-up, to withstand the sealing pressure required.

7. A method according to claim 6, wherein said container is a gable-top configuration container.

8. A method according to claim 6, wherein said container is a flat-top configuration container.

9. A method according to claim 6, wherein said container is a slant-top configuration container.

10. A method according to claim 6, wherein said placing is preceded by forming, filling, and sealing the container.

11. A method for applying a pour spout fitment to a selected panel of a thermoplastic coated container, the method comprising the steps of:
   a. forming a pour spout fitment;
   b. forming, filling, and sealing the container;
   c. heating the pour spout fitment to a predetermined temperature by a suitable heater;
   d. placing the heated pour spout fitment on the selected panel of the formed and sealed container to activate the thermoplastic coating; and
   e. allowing the heated fitment and the activated thermoplastic coating on the panel time to cool, to thereby become bonded together.

* * * * *